United States Patent [19]

Rao et al.

[11] 4,220,987
[45] Sep. 2, 1980

[54] CONVERTER DRIVE CIRCUIT

[75] Inventors: Tadikonda N. Rao, Morris Township, Morris County; Thomas G. Wilson, Jr., Morristown, both of N.J.

[73] Assignee: Bell Telephone Laboratories, Incorporated, Murray Hill, N.J.

[21] Appl. No.: 974,381

[22] Filed: Dec. 29, 1978

[51] Int. Cl.² .................................... H02M 3/335
[52] U.S. Cl. ................................... 363/21; 307/253
[58] Field of Search .............. 307/253, 300; 363/20, 363/21

[56] References Cited

U.S. PATENT DOCUMENTS

| | | | |
|---|---|---|---|
| 3,470,391 | 9/1969 | Granger | 307/300 X |
| 3,569,742 | 3/1971 | Schroeder | 307/253 X |
| 3,831,102 | 8/1974 | Medal | 307/300 X |
| 4,005,317 | 1/1977 | Hinrichs | 307/300 X |
| 4,006,370 | 2/1977 | Erler | 307/300 |

*Primary Examiner*—William M. Shoop
*Attorney, Agent, or Firm*—Robert O. Nimtz

[57] ABSTRACT

A power converter circuit is disclosed utilizing pulse width modulation for power regulation. A rapid acting surge protection circuit for the power driving switch is operated from a string of zener diodes to disable the power switch. A base charge removal circuit is included for dissipating accumulated base charges on the driving transistor without the need for a bipolar driving signal for the power transistor.

5 Claims, 2 Drawing Figures

CONVERTER DRIVE CIRCUIT

BACKGROUND OF THE INVENTION

1. Field of the Invention

This invention relates to electrical power switching circuits and, more particularly, to the control of power switching transistors.

2. Description of the Prior Art

In many applications, such as power conversion circuits, it is necessary to operate transistors as power switches to interrupt substantial current flows. In the presence of such large current flows, a transistor tends to accumulate a charge in the vicinity of the base region which charge interferes with the rapid turn-off of the transistor switch. This problem is aggravated when the transistor is driven by a unipolar driving source since, in this case, it is very difficult to remove the excess base charge accumulated in the switching transistor. In applications such as regulated power supplies, the inability to closely control the turn-off time of a power transistor switch interferes with the regulation process.

SUMMARY OF THE INVENTION

In accordance with the illustrative embodiment of the present invention, a base charge removal circuit is provided for a power transistor driven from a unipolar drive source. The discharge circuit includes a capacitor which can be charged during the ON portion of the driving signal. The accumulated charge on the capacitor is then used to provide a rapid acting sink for the accumulated base charges on the switching transistor immediately upon removal of the driving signal. More particularly, the accumulated base charges on the capacitors can be used to enable a low power transistor switch which, in turn, rapidly removes the accumulated base charge of the high power transistor switch.

The base charge removal circuit of the present invention considerably simplifies the design of switching transistor drive circuits since it makes it unnecessary to provide a bipolar driving signal and, at the same time, insures fast switching times for the power switching transistor in response to the unipolar driving signals. This arrangement is particularly advantageous for Darlington pairs where base charge accumulation is a serious problem.

DETAILED DESCRIPTION

Figure 1:
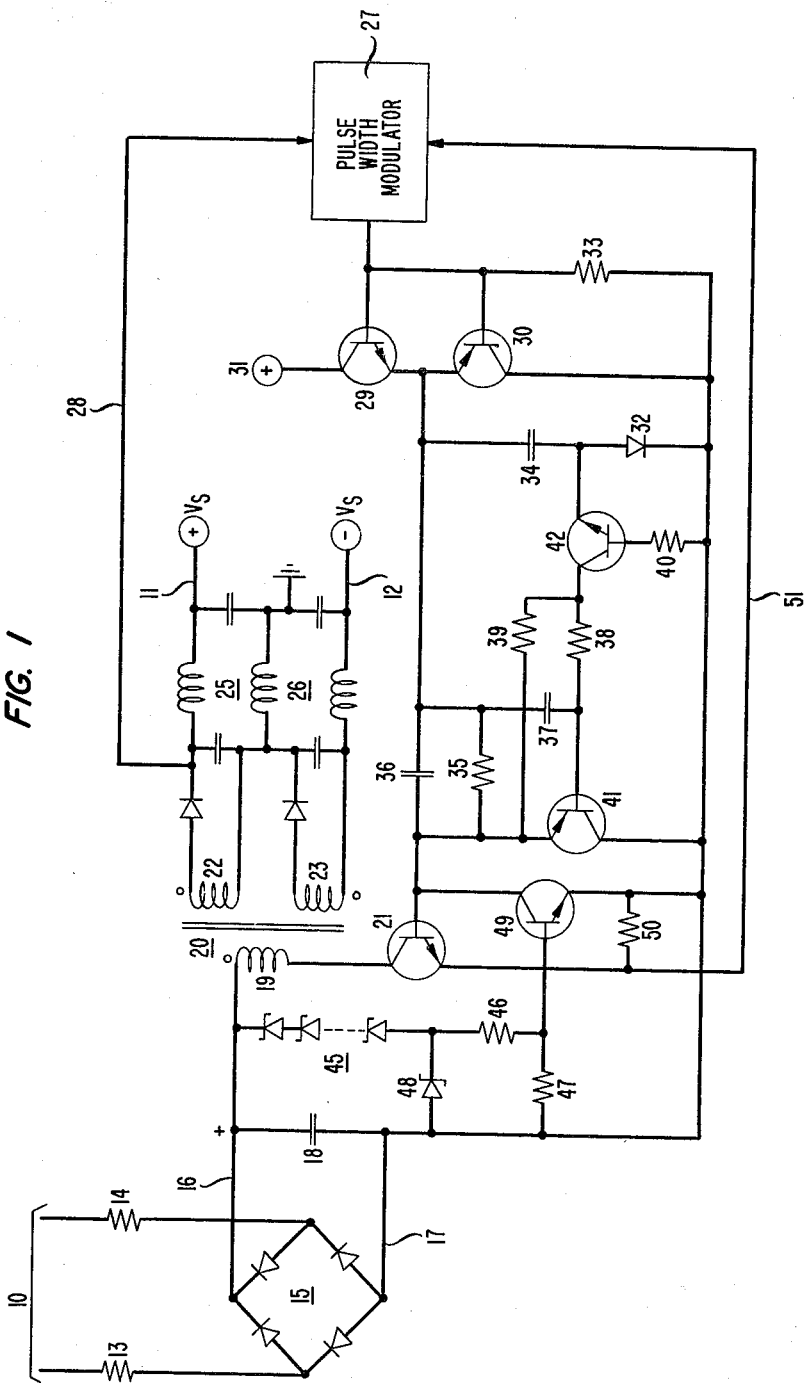
FIG. 1 is a detailed circuit diagram of a power conversion circuit incorporating the base charge removal circuits in accordance with the present invention.

In FIG. 1 of the drawing there is shown a detailed circuit diagram of a power converter circuit utilizing voltages appearing on input lines 10 to generate control operating voltages for electronic equipment on output leads 11 and 12. Input leads 10 are connected through resistors 13 and 14 to a diode bridge circuit 15. Thus, the power on leads 10 can be either direct current or alternating current, or may comprise a direct current with an alternating current superimposed thereon. In any event, a direct current voltage appears between leads 16 and 17, polarized in a direction to make lead 16 positive and lead 17 negative. A capacitor 18 filters out the remaining alternating current component in the rectified signal.

Lead 16 is connected through primary winding 19 of transformer 20 to a transistor switch 21 having its collector-emitter path connected in series with winding 19 and emitter-current sense resistor 50. A pulse width modulated signal on the base of transistor 21 alternately enables and disables the collector-emitter path of transistor 21, causing energy first to be stored in the magnetic field of winding 19 and then to be delivered to the output via the secondary windings 22 and 23 of transformer 20. Additional filtering is provided by low-pass filter sections 25 and 26 to provide positive and negative operating voltages on leads 11 and 12, respectively. The voltage levels appearing on leads 11 and 12 are determined by the turns ratio of transformer 20 as well as by the waveform driving transistor 21.

Voltage regulation for the operating voltages on leads 11 and 12 are provided by means of a pulse width modulator 27 to which the input to filter 25 is connected by way of lead 28. Modulator 27 generates rectangular pulses the width of which are controlled by signals on lead 28, from winding 22, and signals on lead 51, from the emitter of transistor 21. The output of modulator 27 is used to drive a complementary pair of transistors 29 and 30, the collector-emitter paths of which are connected in series between an auxiliary positive voltage source 31 and negative voltage source 17. Resistor 33 provides pull-down capability for transistor 30. The resulting signal at the common emitter connection of transistors 29 and 30 is supplied through an RC circuit including resistor 35 and capacitor 36 to the base of transistor 21. Resistor 35 limits the current drive to transistor 21 while capacitor 36 provides transition speed up. This signal is used to drive transistor 21 off and on in response to the pulse width modulated signal generated by modulator 27.

Since transistor 21 is used to switch relatively high current levels, base charges tend to accumulate in the base-emitter region of transistor 21 during the ON portion of its operating cycle. Attempts to turn transistor 21 off are therefore ineffectual until the accumulated base charges are removed. The base charge accumulation in transistor 21 therefore interferes with the rapid switching action upon which converter efficiency depends.

In accordance with the present invention, in order to rapidly remove accumulated base charges on transistor 21, a base charge removal circuit is provided comprising capacitors 34 and 37, resistors 38, 39 and 40, transistors 41 and 42 and diode 32. During positive excursions of the driving signal to the base of transistor 21, capacitor 34 is charged through the charging circuit including transistor 29 and diode 32. When the driving signal to the base of transistor 21 terminates, transistor 29 turns off and the common emitters of transistors 29 and 30 goes near ground potential (via the emitter-collector path of transistor 30) and the emitter of transistor 42 becomes negative; reverse biasing diode 32. Transistor 42 therefore turns ON, drawing base current from transistor 41 to turn transistor 41 ON. Transistor 41 is therefore immediately enabled to provide a rapid discharge path for the accumulated charge stored on the base of transistor 21.

Capacitor 37 couples the new turn on signal from transistor 29 to the base of transistor 41 to rapidly turn transistor 41 off again. Resistor 38 limits the base current drawn from transistor 41 while resistor 39 bypasses a portion of the current drawn by transistor 42 around the base-emitter path of transistor 41.

It can be seen that the base charge removal circuit provides a low impedance discharge path for base charges on transistor 21 which path is enabled immediately following the termination of the driving pulse. This permits the removal of the base charge from transistor 21 without requiring a supply voltage more negative than lead 17.

A string of zener diodes 45 is connected across capacitor 18. The input voltage for the power converter is therefore impressed across zener diodes 45. A pair of resistors 46 and 47 are connected as a voltage divider across zener diode 48 which is part of the zener diode string 45. When the voltage between leads 16 and 17 exceeds the combined breakdown voltages for zener diodes 45, a controlled voltage (determined by the breakdown voltage of zener diode 48) is impressed across the voltage divider comprising resistors 46 and 47. The midpoint of resistors 46 and 47 is connected to the base of transistor 49. When enabled, transistor 49 short-circuits the base-emitter circuit of transistor 21, thereby disabling transistor 21.

It can be seen that, in the presence of a surge voltage on leads 10, string 45 breaks down to enable transistor 49 and thereby immediately disable switching transistor 21. The balance of the electronic circuitry connected to leads 11 and 12 is therefore protected from excessive voltages which might otherwise result from a large surge in the voltage on leads 10. The protector circuit consists of zener diode string 45, resistors 46 and 47 and transistor 49. Only the diode string 45 is exposed to the large voltage surges, while transistor 49 may be a small and inexpensive transistor since it is not exposed to any damaging voltages.

Figure 2:
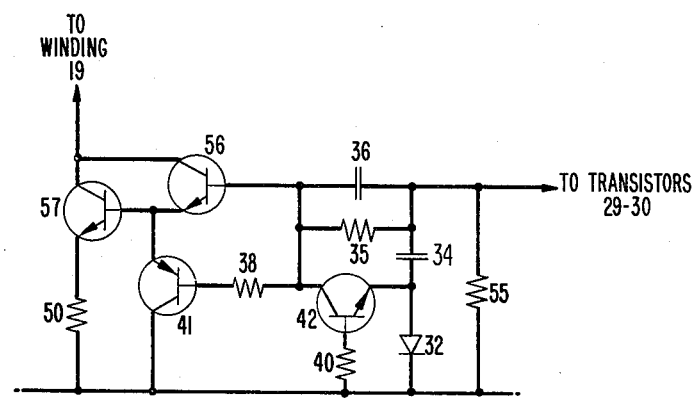
FIG. 2 is a partial circuit diagram of another version of the base charge removal circuits for a Darlington pair.

In FIG. 2 of the drawings there is shown a partial circuit diagram of another circuit for removing base charges from a Darlington pair transistor switch. Components in FIG. 2 which are identical to those shown in FIG. 1 are identified with the same reference numerals. Transistor 21, however, is replaced with a Darlington pair 56 and 57 which operates together as a transistor switch to gate current through winding 19. The charge removal circuit includes a resistor 55 connected in parallel with capacitor 34 and diode 32 to provide an alternate path for holding the common emitter connection of transistors 29 and 30 near ground potential. In the circuit of FIG. 2, transistor 41 draws the accumulated base charge from transistor 57 while transistor 42, in addition to enabling transistor 41, draws off the base charge from transistor 56. In all other respects, the circuit of FIG. 2 operates in the same fashion as that of FIG. 1. The surge protection transistor 49 is not shown in FIG. 2 but surge protection could be added by providing transistors across the base-emitter paths of both of transistors 56 and 57.

I claim:

1. A transistor base charge removal circuit for high power switching transistors
   characterized by
   charge storage means connected in shunt with the base-emitter path of said transistor for accumulating a charge during the time said switching transistor is enabled, and
   a base charge removal path for said switching transistor enabled by the charge on said charge storage means when said switching transistor is disabled.

2. The transistor base charge removal circuit according to claim 1
   characterized by
   a diode connected in the charging circuit for said charge storage means.

3. The transistor base charge removal circuit according to claim 1
   characterized in that
   said discharge path includes the collector-emitter path of another transistor.

4. The transistor base charge removal circuit according to claim 1
   characterized in that
   said charge storage means comprises a capacitor.

5. A drive circuit for power switching transistors operated from a unipolar drive pulse source
   characterized by
   a capacitive charging circuit connected in parallel with said unipolar drive pulse source,
   means for charging said charging circuit during the active half-cycle of said drive pulse, and
   means for utilizing said charging circuit to remove stored base charges on said switching transistors at the end of said active half-cycle.

* * * * *